(12) United States Patent
Martin

(10) Patent No.: US 7,607,840 B2
(45) Date of Patent: Oct. 27, 2009

(54) TACTICAL FLEXIBLE FIBRE OPTIC SPLICE ENCLOSURE AND METHOD OF INSTALLATION

(76) Inventor: Eric Martin, 114 Swift Street, Dunrobin, ON (CA) K0A 1T0

( * ) Notice: Subject to any disclaimer, the term of this patent is extended or adjusted under 35 U.S.C. 154(b) by 0 days.

(21) Appl. No.: 11/759,522

(22) Filed: Jun. 7, 2007

(65) Prior Publication Data

US 2007/0297744 A1 Dec. 27, 2007

(30) Foreign Application Priority Data

Jun. 7, 2006 (CA) .................................. 2549538

(51) Int. Cl.
*G02B 6/255* (2006.01)
(52) U.S. Cl. .......................................... 385/95; 385/99
(58) Field of Classification Search ................ 385/95
See application file for complete search history.

(56) References Cited

U.S. PATENT DOCUMENTS 4,498,732 A * 2/1985 Campbell et al. ........... 385/135

2005/0129375 A1* 6/2005 Elkins et al. ................. 385/100
2007/0212005 A1* 9/2007 Lu et al. ...................... 385/100

* cited by examiner

*Primary Examiner*—Uyen Chau N Le
*Assistant Examiner*—Kajli Prince
(74) *Attorney, Agent, or Firm*—Louis F. Wagner; Hahn Loeser + Parks LLP

(57) ABSTRACT

The present invention relates to fibre optics and more particularly to flexible, durable, fibre optic splices, and methods of installing such splices. One embodiment of the invention comprises a fibre optic splice comprising: a flexible central tensile member; a flexible helical wrapping positioned about the flexible central tensile member; and an outer protective jacket positioned about the flexible helical wrapping. The flexible central tensile member and the flexible helical wrapping define a splice enclosure to accommodate optical fibres of the splice, at least a portion of the optical fibres being arranged in a generally helical orientation within the splice enclosure.

17 Claims, 5 Drawing Sheets

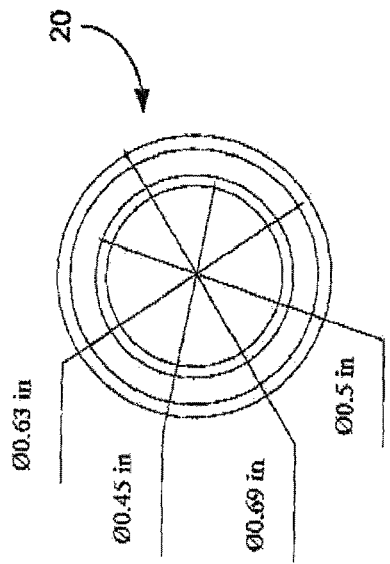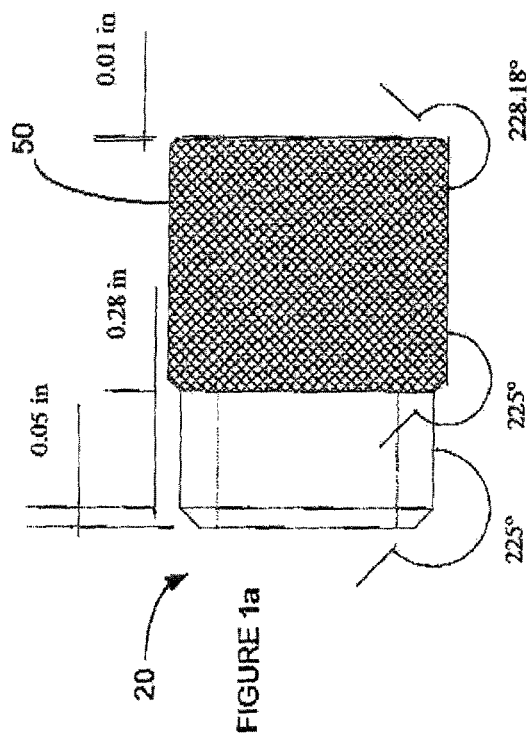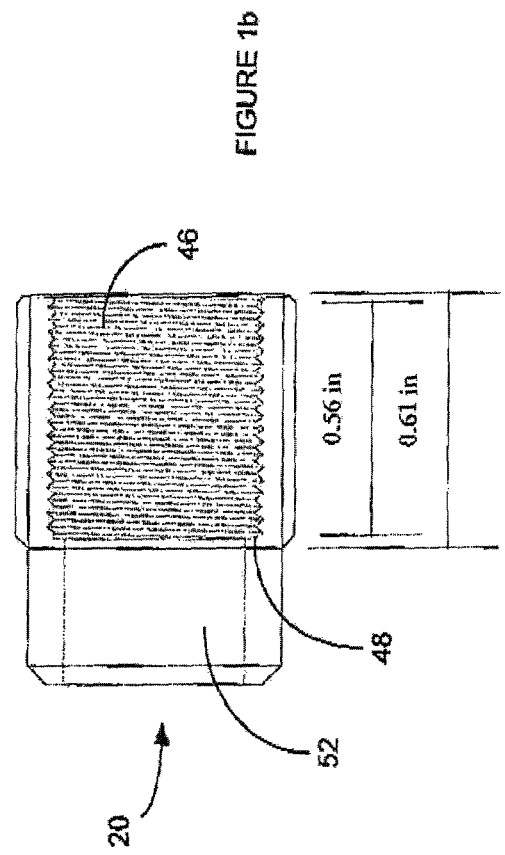

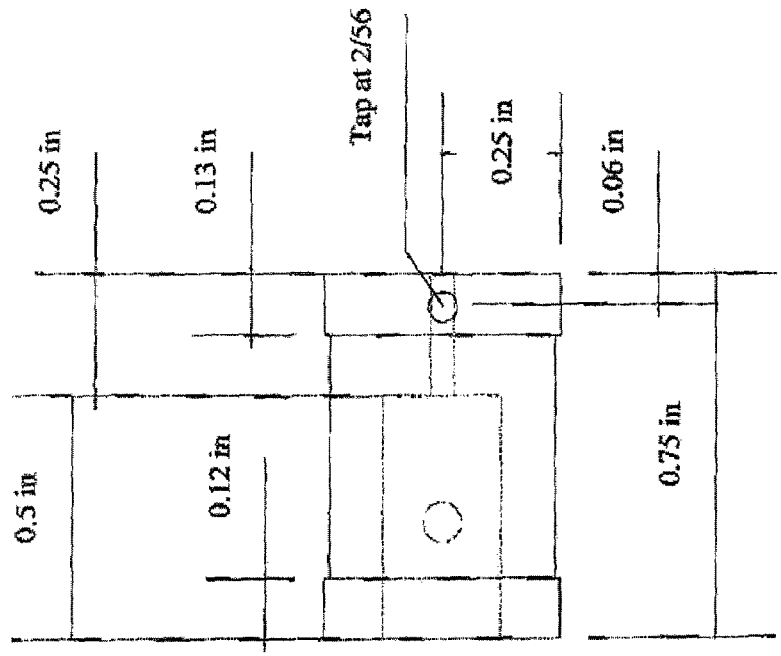
FIGURE 3c
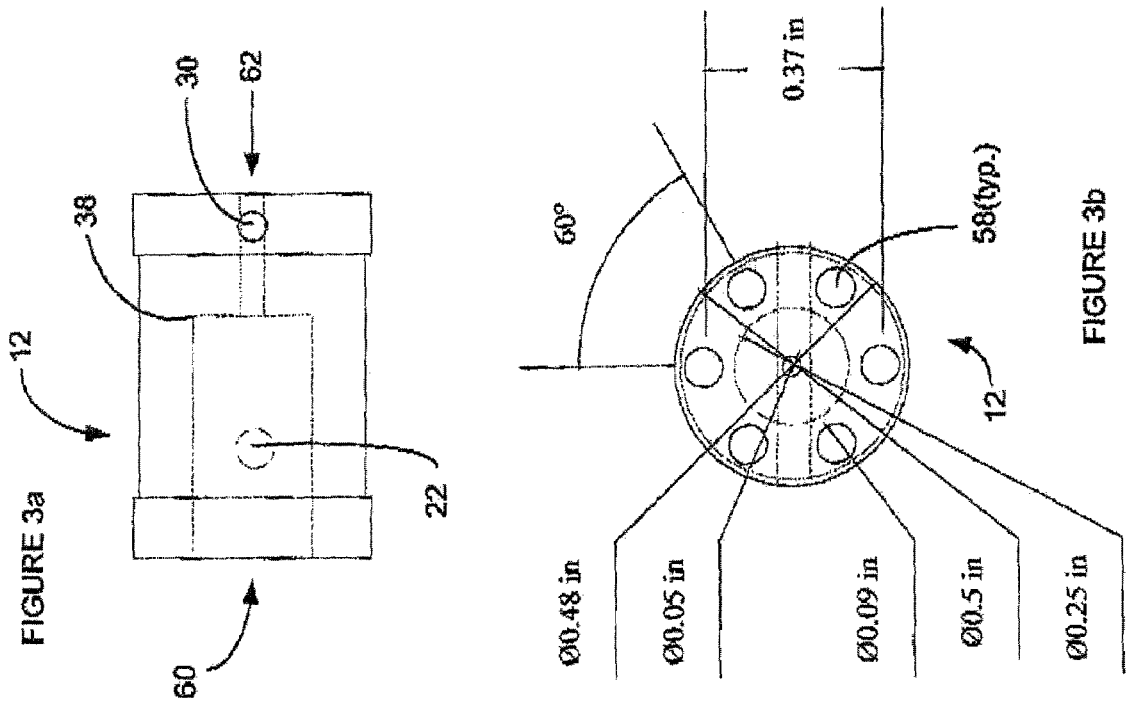
FIGURE 3a
FIGURE 3b

SPLICED FIBERS ARE PLACED IN SPLICE SLEEVE

SPLICE SLEEVE COVERS ARE CLOSED AND FIBERS ARE PLACED ON CSM

SPIRAL WRAP IS INSTALLED AND SPLICE IS READY FOR HEATSHRINK COVER

FINISHED SPLICE WITH HEATSHRINK IN PLACE

TACTICAL FLEXIBLE FIBRE OPTIC SPLICE ENCLOSURE AND METHOD OF INSTALLATION

FIELD OF INVENTION

The present invention relates to fibre optics and more particularly to flexible, durable, fibre optic splices, and methods of installing such splices.

BACKGROUND

The world of optical fibre communications often requires that optical fibres be joined in order to obtain longer distances between optical transceivers. This process is known in the communications industry as splicing.

The military uses a system of communications known as tactical communications. This system utilizes special rugged fibre optic cables, having generally 2 to 4 optical fibres per cable, which are stored on reels. The cable is deployed in the field and interfaced to fibre optic transceivers at each end thus providing communications. During field activities, the cable is often damaged and must be repaired on site.

Splicing fibre optic cables together is not an easy task because the splice must be rugged and yet flexible. Many splice systems lack tensile strength because the splice mechanism does not extend the continuity in the strength member of the cables. Those splices that show good compressive strength do so at the expensive of bulkiness, which interferes with retrieval and redeployment of the cable. Flexibility is also beneficial during retrieval and redeployment, which is a problem because most splice systems are very stiff.

While splice flexibility is desirable for practical reasons, there is a problem in that fibre optic cables will become damaged or performance will be impaired if the fibres are bent in too tight a radius. Thus, there is a need for a flexible splice that nonetheless prevents the fibres from being bent into dangerously tight radii.

Tactical military cable systems are also required to tolerate harsh environmental conditions, which many splice systems cannot reliably endure.

Difficulties also arise while installing the splice itself. Most splicing systems that accommodate multi-fibre cables are not forgiving. That is, each of the splices in the multi-fibre cable must be approximately the same length because the splice enclosure cannot accommodate any excess fibre length. Thus, if the user happens to damage a fibre splice after having completed half of the splices in a multi-fibre cable, he is generally forced to abandon all of the completed splices and start again.

There is therefore a need for an improved fibre optic cable splice enclosure and method of installation, provided with consideration for the problems outlined above.

SUMMARY OF THE INVENTION

It is therefore an object of the invention to provide an improved fibre optic splice and method of assembly, which obviates or mitigates at least one of the disadvantages described above.

One aspect of the invention is broadly defined as a fibre optic splice comprising: a flexible central tensile member; a flexible helical wrapping positioned about the flexible central tensile member; and an outer protective jacket positioned about the flexible helical wrapping; the flexible central tensile member and the flexible helical wrapping defining a splice enclosure to accommodate optical fibres of the splice, at least a portion of the optical fibres being arranged in a generally helical orientation within the splice enclosure.

Another aspect of the invention is broadly defined as a method of splicing a fibre optic cable comprising the steps of: arranging at least a portion of the optical fibres being spliced, in a generally helical orientation about a flexible central tensile member; positioning a flexible helical wrapping about the optical fibres and the flexible central tensile member, the flexible central tensile member and the flexible helical wrapping defining a splice enclosure to accommodate the optical fibres being spliced; and positioning an outer protective jacket about the flexible helical wrapping.

A further aspect of the invention is broadly defined as a pre-assembled fibre optic splice system comprising: a splice sleeve having generally axially-oriented channels sized to accommodate spliced optical fibres; a removable cover for the splice sleeve; a flexible central tensile member, the flexible central tensile member passing through the splice sleeve; and a pair of cable bonding clamps, one secured to each end of the flexible central tensile member.

This summary does not necessarily describe all features of the invention.

BRIEF DESCRIPTION OF THE DRAWINGS

These and other features of the invention will become more apparent from the following description in which reference is made to the appended drawings wherein:

FIGS. 1a, 1b and 2c present details of a splice sleeve cover in an embodiment of the invention;

FIGS. 2a, 2b and 2c present details of a splice sleeve in an embodiment of the invention;

FIGS. 3a, 3b and 3c present details of a cable bond clamp in an embodiment of the invention;

PRINCIPLES OF OPERATION

Figure 2A:
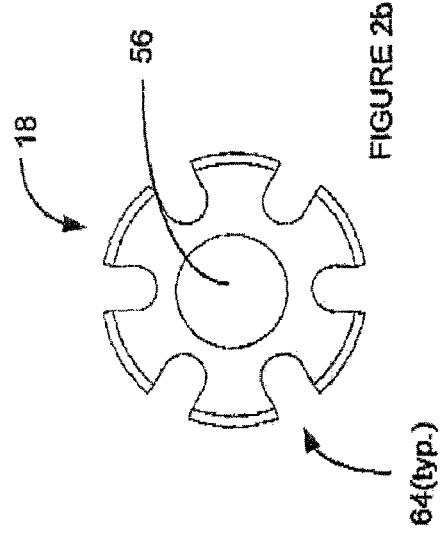

This document describes an environmentally sealed, in-line fibre optic cable, flexible splice enclosure. Until now flexible inline splice enclosures have been extremely limited in their ability to achieve a tight bend radius. The main reason for this is the inability of inline splice enclosures to allow for excess fibre slack. The flexible splice described herein is able to achieve tight bend radius specifications and is able to accommodate different fibre lengths due to its unique method of accommodating and storing excess fibre slack.

As shown in FIGS. 4a-4d, the splice enclosure 10 is made up of the following major components: a pair of cable bond clamps 12, a splice sleeve/cover combination 14, and a flexible, central length of neoprene 16. The cable bond clamps 12 (an example of which is shown in FIGS. 3a-3c) are joined together by the flexible central neoprene tensile member 16, which passes through a splice sleeve 18 and a pair of splice sleeve covers 20 (examples of which are shown in FIGS. 2a-2c and FIGS. 1a-1c respectively). Other polymers or similar flexible materials with suitable durability and tensile strength could also be used for the central tensile member 16. The cable bond clamps 12, splice sleeve 18 and splice sleeve covers 20 are shown in the figures as being made from brass, but other materials such as aluminum could be used depending on the application and cost constraints (non-sparking, corrosion resistant, non-magnetic, non-electrical conducting and fire-resistant properties are often desirable for such components, depending on the application). All of the components of the system preferably satisfy these requirements and also remain flexible and durable over a temperature range of −70° C. to 100° C.

As will be explained in greater detail hereinafter, the role of the splice sleeve/cover combination 14 is simply to provide mechanical protection for the optical fibre splices themselves. As shown in FIGS. 1a-1c, the splice sleeve covers 20 include an internal thread 46 to engage with the external thread 54 of the splice sleeve 18, and a shoulder 48 to bear against the end of the splice sleeve 18. They also include a knurled or cross-hatched outer surface 50 to facilitate tightening by hand. Of course, the splice sleeve covers 20 also include a bore 52 that is wide enough to accommodate the passage of the optical fibres 24 and neoprene central member 16, and the dimensions of the spiral wrap fibre retainers 26, 26'. Finally, note that the outer edges of the splice sleeve covers 20 are preferably rounded off or beveled as shown in FIG. 1a, to remove sharp or simply abrupt edges which might cause damage to the cable, splice, or other components of the system.

Figure 2B:
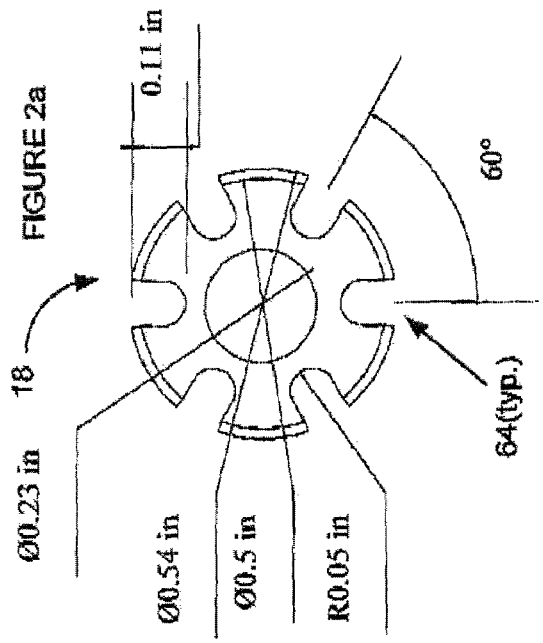
Figure 2C:
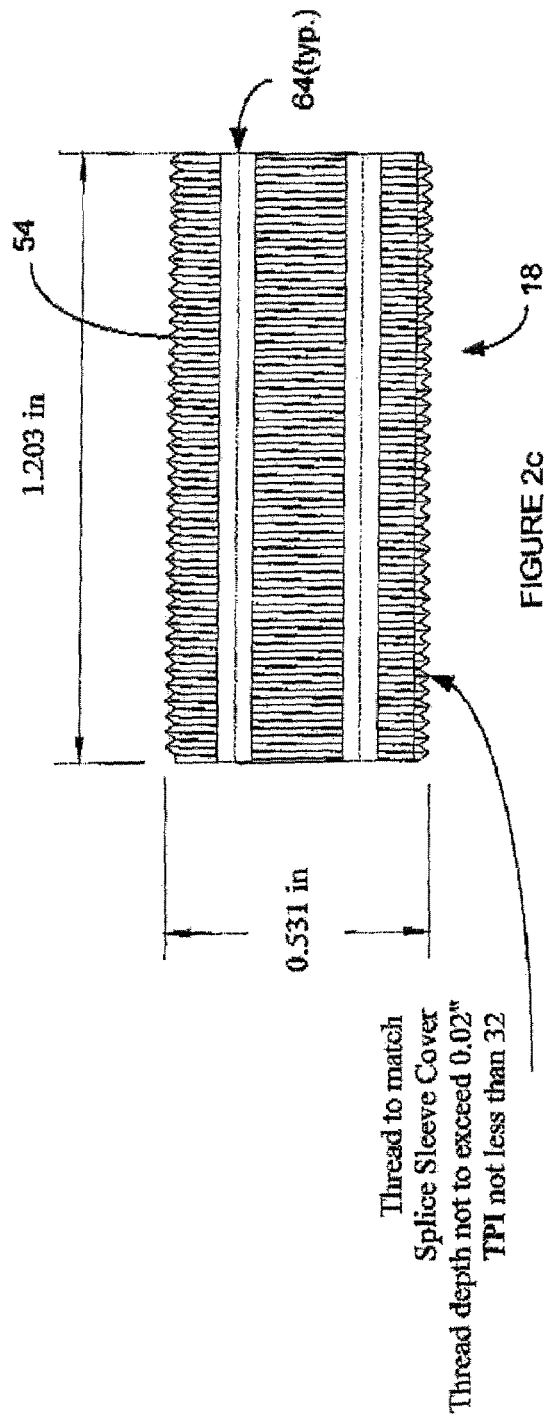

As shown in FIGS. 2a-2c, the splice sleeve 18 has an external thread 54 that engages with the internal threads 46 of the splice sleeve covers 20, and an internal bore 56 to accommodate passage of the neoprene central member 16. It also includes channels or slots 64 running axially along its outer surface, sized to accommodate individual, spliced optical fibres. In this embodiment the splice sleeve 18 has six channels 64 on its outer surface, equally spaced apart around the circumference, but any number and arrangement may be used.

The cable bond clamps 12 are joined to the neoprene central member 16 both chemically using epoxy, and mechanically with a press-fit stainless steel pin applied through a hole 22 in the cable bond clamps 12. Other chemical bonding compounds could also be used, and similarly, other mechanical pins, crimps or similar fasteners could also be used. All tensile forces are thereby transferred from the first cable in the splice, through the neoprene central member 16 to the second cable. The elastic properties of the neoprene central member 16 allows for fibre movement when the tensile loads are placed on the cable. The neoprene central member 16 also absorbs shock well and allows for immediate recovery in the case of momentary shock loads.

As shown in FIGS. 3a-3c, the cable bond clamps 12 are generally cylindrical and include two bores 60 and 62 centered on the primary axis. The larger bore 60 is sized to accommodate the neoprene central member 16, while the (typically) smaller bore 62 is sized to accommodate the central strength member of the optical cable 28 being spliced. The cable bond clamps 12 are drilled 22 to intersect with the larger bore 60, allowing a pin (or other fastener) to be insert through the cable bond clamps 12 and neoprene central member 16. The cable bond clamps 12 are also drilled and tapped 30 to intersect with the smaller bore 62, so that a set screw 40 (see FIG. 5a) can be used to secure the central strength member of the optical cable 28 after it is inserted. The cable bond clamps 12 also include a shoulder 38 that the heat shrink Kevlar retainers 34 may bear against (see FIG. 5b), providing additional tensile strength. Finally, the cable bond clamps 12 also include a number of individual sub-cable holes 58 (see FIG. 3b), oriented in the axial direction and preferable equally spaced apart, through which the sub-cable units (i.e. individual optical fibres) of the optical cable 28 may pass.

Figure 4A:
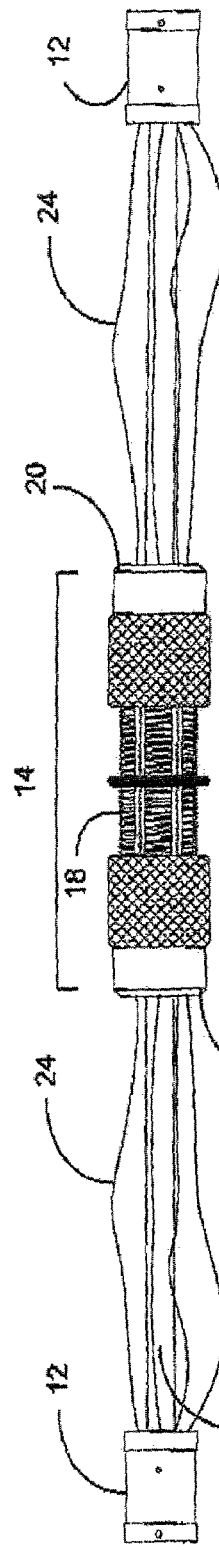
FIGS. 4a-4d present successive steps in the assembly of a fibre optic splice in an embodiment of the invention.
Figure 4B:
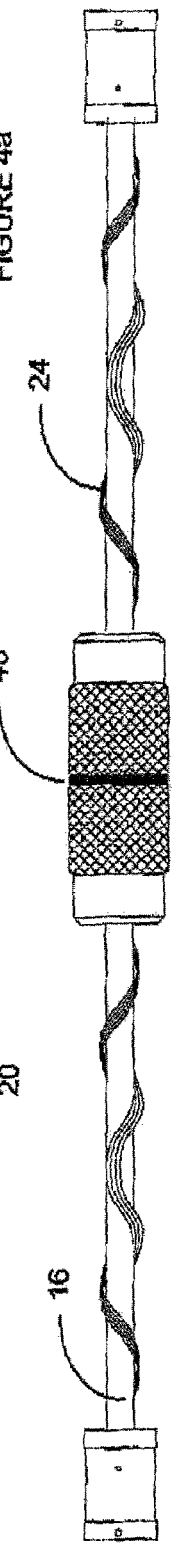

Although the neoprene central member 16 is a significant reason for the success of the splice enclosure 10, the method of slack storage by helically winding the optical fibres 24 loosely around the neoprene central member 16 as shown in FIG. 4b, also provides many advantages. By providing the optical fibres 24 with radial support and enough excess optical fibre within the splice enclosure 10, optical fibre movement is controlled without affecting optical loss or stability in a wide range of travel.

Figure 4C:
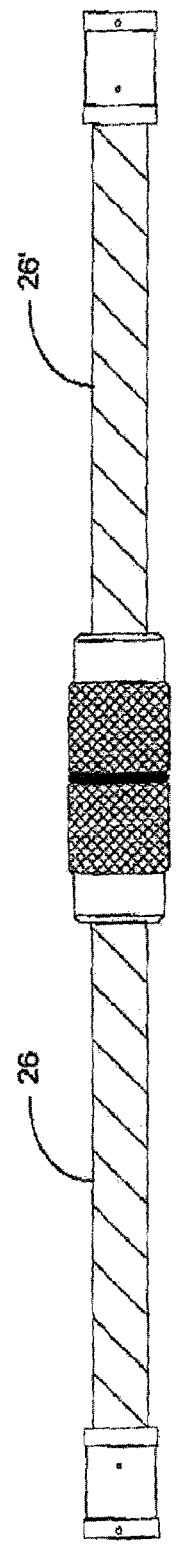

The two lengths of spiral wrap 26, 26' shown in FIG. 4c simply provide a conduit for the optical fibres 24 to move within while acting as a radius limiter to avoid any kinking of the optical fibres 24. The material of the spiral wrap 26 is generally made up of Teflon but can be made up of any flexible, non-metallic material that presents no sharp edges and has the ability to recover, and maintain its original shape after being exposed to compressive and tensile loads. It also provides impact resistance for the exposed optical fibres 24. The splice enclosure 10 is therefore able to dynamically adjust diameters and optical fibre slack according to the loads placed on the cable 28. The storage of the excess optical fibre slack also removes the need to keep spliced optical fibres at the same length so long as the splices are kept central, and a minimum of optical fibre slack is maintained. This more forgiving method will allow field technicians to repeat a splice if required without the need to repeat all splices and cable preparation.

As noted above, the central strength members of the fibre optic cables 28 are bonded to the cable bond clamps 12 via mechanical means. Each cable bond clamp 12 is drilled and tapped 30 (see FIG. 3a) so that the central strength members of the fibre optic cables 28 can be bonded with a setscrew 40 (see FIG. 5a). The cable tensile strength member (i.e. the outer Kevlar-stranded jacket 32 of the fibre optic cable 28) is also bonded to the cable bond clamp 12 via a pair of heat shrinks 34, 36 and a shoulder 38 on the cable bond clamp 12. See FIGS. 5a-5d and the description hereinafter for a more detailed explanation of this arrangement.

Figure 5A:
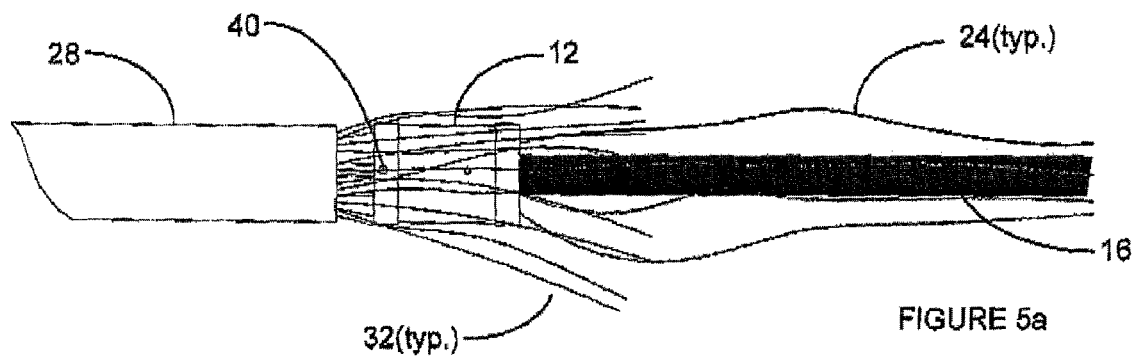
FIGS. 5a-5d present successive steps in the termination of a fibre optic cable to a cable bond clamp in an embodiment of the invention.

FIG. 5a shows a fibre optic cable 28 with its central strength member fastened to the cable bond clamp 12 using the set screw 40, and the optical fibres 24 of the cable 28 passing through the sub-cable holes 58 of the cable bond clamp 12. Then, in FIG. 5b, a Kevlar retainer heat shrink 34 is installed over the outer layer of Kevlar 32 (i.e. the cable tensile strength member) that has been fanned out equally over the cable bond clamp 12 and is shrunk into place. Note that in breakout cable the outer Kevlar is used and the sub-cable Kevlar is discarded, while in distribution cable (where the optical fibres are surrounded by the cable tensile strength member) all of the Kevlar is used.

Figure 5B:
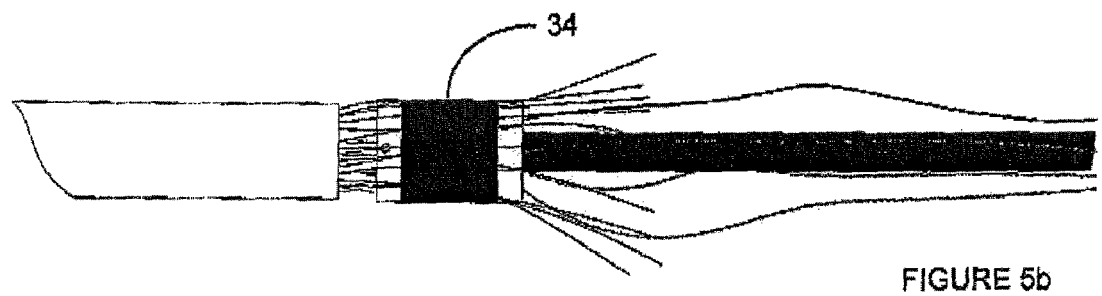
Figure 5C:
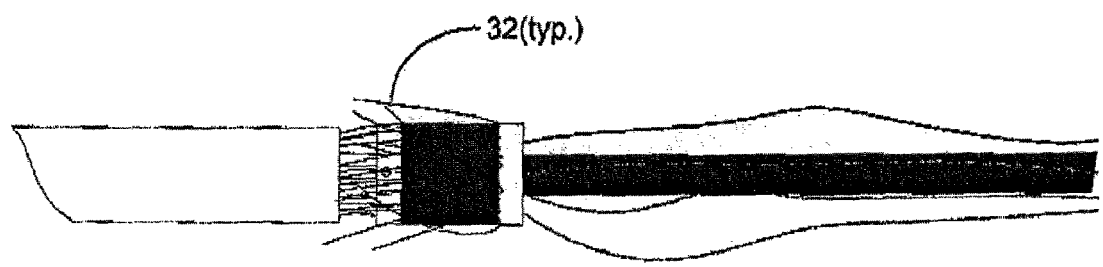
Figure 5D:
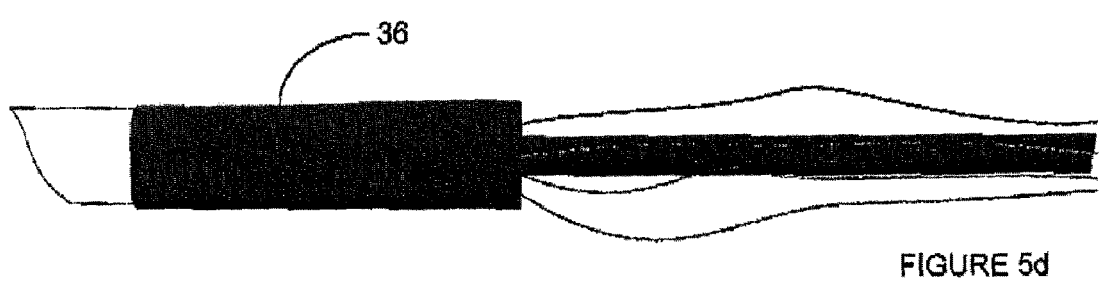

The outer layer of Kevlar 32 is then folded back over the newly installed Kevlar retainer heat shrink 34, covering the entire bond clamp assembly and a portion of the cable outer jacket, as shown in FIG. 5c. A heat shrink cable bond cover 36 is then placed over the outer Kevlar-stranded jacket 32 which has been folded back, and is heat-shrunk into place as shown in FIG. 5d. This effectively locks the outer Kevlar-stranded jacket 32 in place. All loads are thus transferred from one cable 28 to another through the neoprene central member 16. The optical fibres 24 are allowed enough movement to adjust to these loads.

Figure 4D:
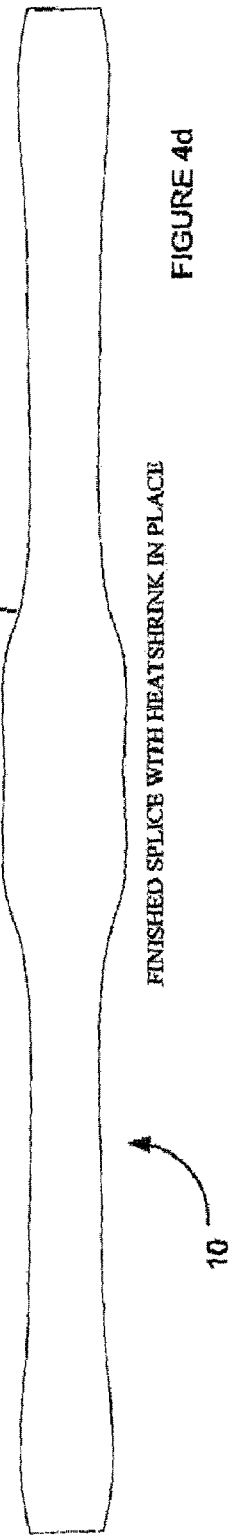

The overall assembly is also covered with an adhesive lined heat shrink material 44 as shown in FIG. 4d that provides environmental sealing to the completed splice. The splice in its current form is designed to accommodate up to 6 fibres. Larger versions can be made to accommodate higher fibre counts.

Enclosure Components

The splice structure includes the following components.

two cable bond clamps 12
one splice sleeve 18
two splice covers 20
one Neoprene central member 16
one O-ring retainer 46
two spiral wrap fibre retainers 26, 26'
two heat shrink cable bond covers 36 (2" in length adhesive lined)
two heat shrink Kevlar retainers 34 (0.5" in length)
one complete assembly heat shrink cover 44
twelve sub-cable heat shrink sleeves (depending on how many fibres are being spliced in the single cable), which protect the optical fibres of distribution-type cables, where they pass through the cable bond clamps 12
twelve splice protection sleeves (again, depending on how many fibres are being spliced in the single cable), which consist of stainless steel rods and heat shrink material as known in the art.

Factory Pre-Assembly

In the pre-assembly process, the cable bond clamps 12 are installed onto the neoprene central member 16 in order to reduce the number of steps required for field termination and to simplify the overall installation process.

The pre-assembly consists of inserting the neoprene central member 16 through the splice sleeve 18 with the two splice covers 20 and O-ring 46 in place. Once the splice sleeve 18 is in place, the neoprene central member 16 is bonded to the cable bond clamps 12 using an epoxy (though other adhesives, cements or resins could also be used). The cable bond clamps 12 are heat cured to insure a proper bond between the neoprene central member 16 and the cable bond clamps 12 (whether heat curing or some other treatment is required, of course, will depend on the nature of the adhesive or cement being used). Once the epoxy is cured and the retaining pin hole 22 on the cable bond clamp 12 is drilled out, a stainless steel retaining pin is pressed into place using a mechanical press. Once this is done the set screws 40 are installed in the cable bond clamps 12 and the product is inspected and packaged for field use.

Installation

For breakout style tactical cable, the cable 28 is prepared as follows:

1—On one cable 28 to be spliced, insert the heat shrink cover 44, one heat shrink cable bond clamp cover 36 and one heat shrink Kevlar retainer 34

2—On the other cable 28, insert the remaining heat shrink cable bond clamp cover 36 and the remaining heat shrink Kevlar retainer 34

3—Remove 12" of outer jacket of fibre optic cable 28

4—Cut the outer cable Kevlar 32 back to 2" from the outer jacket

5—Cut the cable central strength member (CSM) to ½" from outer jacket

6—Insure the set screw 40 in cable bond clamp 12 cannot be seen through the CSM receptacle 7—Insert sub-cable units through the individual sub-cable holes 58 in the cable bond clamp 12

8—Push the cable bond clamp 12 back until the CSM seats properly into the bore 62 of the cable bond clamp 12 (as shown in FIGS. 3a and 3c, there are two bores in the cable bond clamps 12 with a common axis—the larger bore 60 is to accommodate the neoprene central member 16, while the smaller bore 62 is sized to accommodate the CSM)

9—Tighten the set screw 40 in cable bond clamp 12 to hold CSM in place. Note that the set screw 40 is merely intended to assist with assembly, and is not intended to provide tensile strength to the splice.

10—Remove sub-cable jackets ¼" from inside edge of cable bond clamp 12 and cut sub-cable Kevlar 32 flush with jackets.

11—Fan the outer cable Kevlar 32 over, and evenly distribute around cable bond clamp 12 as shown in FIG. 5a 12—Shrink the Kevlar retainer heat shrink 34 over the cable bond clamp 12 and outer cable Kevlar 32 as shown in FIG. 5b 13—Take excess outer cable Kevlar 32 and fold over the previously installed Kevlar retainer heat shrink 34 (per FIG. 5c) and cover with the heat shrink cable bond clamp cover 36 so that the Kevlar 32 is held between the Kevlar retainer heat shrink 34 and the heat shrink cable bond clamp cover 36. The heat shrink cable bond clamp cover 36 should overlap the cable outer jacket by at least ¾". Heat shrink when properly set in place (per FIG. 5d)

14—Remove the splice sleeve cover 20 and O-ring retainer 46 from the splice sleeve 18 and insert the individual optical fibres 24 through these components.

15—On one cable 28, insert one splice protection sleeve per optical fibre, over each optical fibre 16—Strip and cleave each optical fibre as per normal splicing practices For distribution style tactical cable use the following instructions:

1—Follow instructions 1-5 from the paragraph above

2—Insert on each optical fibre, one sub-cable heat shrink sleeve, push sleeve back to outer cable jacket and shrink into place 3—Continue with instructions 6-16 from the paragraph above.

Regardless of which of the two processes above is followed, the balance of the steps may now be performed:

17—Splice optical fibres of the cable as per standard practices using fusion-splicing techniques.

18—Protect each optical fibre splice with splice protection sleeves and heat shrink into place 19—Once all of the optical splices have been completed and connectivity has been verified, insert the completed splices in the provided slots 64 in the splice sleeve 18 and place the O-ring retainer 46 over the splice centred on the splice sleeve 18 as shown in FIG. 4a. The purpose of the O-ring retainer 46 is to hold the optical splices in place to facilitate the installation of the splice sleeve covers 20

20—Thread on the splice sleeve covers 20 until they stop

21—Starting on the left side of the splice, between the splice sleeve 18 and the cable bond clamp 12, wrap the optical fibres 24 loosely and helically around the neoprene central member 16 wrapping from the outside towards the centre as shown in FIG. 4b 22—Once the optical fibres 24 are in place, install the spiral wrap fibre retainer 26, 26' over the optical fibres 24 as shown in FIG. 4c, being careful not to catch any of the optical fibres 24 and insuring that the optical fibres 24 are moving loosely under the spiral wrap fibre retainer 26, 26'. The spiral wrap fibre retainer 26, 26' will terminate under the splice sleeve cover 20, the axial bore 52 of the splice sleeve cover 20 being sized to accommodate 23—Repeat the previous two steps for the right side of the splice.

24—With both sides of the splice complete, cover the overall splice using the complete assembly heat shrink cover 44, as show in FIG. 4d. Keep the splice sleeve centred and shrink the cover 44 from the centre towards the outer edges to insure that no air is trapped in the splice.

25—Allow the entire assembly to cool and deploy.

All citations and references to known materials, are hereby incorporated by reference.

The present invention has been described with regard to one or more embodiments. However, it will be apparent to persons skilled in the art that a number of variations and modifications can be made without departing from the scope of the invention as defined in the claims.

What is claimed is:

1. A fibre optic splice comprising:
   a flexible central tensile member;
   a flexible helical wrapping positioned about said flexible central tensile member; and
   an outer protective jacket positioned about said flexible helical wrapping;
   said flexible central tensile member and said flexible helical wrapping defining a splice enclosure to accommodate optical fibres of said splice, at least a portion of said optical fibres being arranged in a generally helical orientation within said splice enclosure; and
   a pair of cable bonding clamps, one mounted at each end of said flexible central tensile member, and means for connecting each of said cable bonding clamps to the central strength member of a cable being spliced.

2. The fibre optic splice of claim 1 wherein said flexible central tensile member contracts when stretched, providing additional space for said optical fibres.

3. The fibre optic splice of claim 1 further comprising a splice sleeve /cover combination to protect optical splices.

4. The fibre optic splice of claim 3 wherein said splice sleeve comprises a central bore allowing said flexible central tensile member to pass through.

5. The fibre optic splice of claim 3 wherein said splice sleeve comprises channels running axially along its outer surface, equally spaced apart, and sized to accommodate a spliced optical fibre.

6. The fibre optic splice of claim 3 wherein said splice sleeve comprises external threads to matingly engage with internal threads of said cover.

7. The fibre optic splice of claim 3 wherein said cover comprises a knurled / cross-hatched outside surface to facilitate tightening by hand.

8. The fibre optic splice of claim 1 wherein said outer protective jacket comprises an adhesive-lined heat shrink jacket.

9. The fibre optic splice of claim 1 further comprising heat shrink sleeves to secure an outer jacket of said cable to said cable bonding clamps.

10. The fibre optic splice of claim 1 fabricated using non-sparking materials.

11. The fibre optic splice of claim 1 fabricated using corrosion resistant materials.

12. The fibre optic splice of claim 1 fabricated using non-magnetic materials.

13. The fibre optic splice of claim 1 fabricated using non-electrical conducting materials.

14. The fibre optic splice of claim 1 fabricated using materials which remain flexible over a temperature range of $-70°$ C. to $100°$ C.

15. The fibre optic splice of claim 1 fabricated using fire-resistant materials.

16. The fibre optic splice of claim 1 wherein said cable bond clamps are secured to said cable central strength member with set screws.

17. A method of splicing a fibre optic cable having a central strength member and optical fibres comprising the steps of:
   providing a pair of cable bonding clamps, one mounted at each end of a flexible central tensile member, and connecting each of said cable bonding clamps to a central strength member of the fibre optic cable being spliced;
   arranging at least a portion of the optical fibres being spliced, in a generally helical orientation about the flexible central tensile member;
   positioning a flexible helical wrapping about said optical fibres and said flexible central tensile member, said flexible central tensile member and said flexible helical wrapping defining a splice enclosure to accommodate said optical fibres being spliced; and
   positioning an outer protective jacket about said flexible helical wrapping and said cable bonding clamps.

\* \* \* \* \*